(12) United States Patent
Takahashi

(10) Patent No.: US 11,186,028 B2
(45) Date of Patent: *Nov. 30, 2021

(54) BLOW MOLD UNIT, BLOW MOLDING MACHINE AND METHOD FOR REPLACING BLOW MOLD UNIT

(71) Applicant: NISSEI ASB MACHINE CO., LTD., Nagano (JP)

(72) Inventor: Junji Takahashi, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 347 days.

This patent is subject to a terminal disclaimer.

(21) Appl. No.: 16/121,102

(22) Filed: Sep. 4, 2018

(65) Prior Publication Data

US 2018/0370111 A1  Dec. 27, 2018

Related U.S. Application Data

(63) Continuation of application No. 14/353,759, filed as application No. PCT/JP2012/077272 on Oct. 22, 2012, now Pat. No. 10,086,552.

(30) Foreign Application Priority Data

Oct. 24, 2011 (JP) .................................. 2011-232359

(51) Int. Cl.
   *B29C 49/28* (2006.01)
   *B29C 49/56* (2006.01)
   (Continued)

(52) U.S. Cl.
   CPC .............. *B29C 49/28* (2013.01); *B29C 49/48* (2013.01); *B29C 49/56* (2013.01); *B29C 49/06* (2013.01);
   (Continued)

(58) Field of Classification Search
   USPC ........................................................ 264/39
   See application file for complete search history.

(56) References Cited

U.S. PATENT DOCUMENTS 3,861,845 A   1/1975  Butcher
6,116,888 A * 9/2000  Johnston ............. B29C 33/3835
                                                          425/195
(Continued)

FOREIGN PATENT DOCUMENTS

CN       1212650 A       3/1999
JP       A-H8-025469     1/1996
(Continued)

OTHER PUBLICATIONS

International Search Report, International Application No. PCT/JP2012/077272, dated Nov. 9, 2012.
(Continued)

*Primary Examiner* — Michael N Orlando
*Assistant Examiner* — Elizabeth Bradford
(74) *Attorney, Agent, or Firm* — David L. Hoffman; Nolan Heimann LLP

(57) ABSTRACT

A blow mold unit including: a blow mold including first and second blow cavity split molds and a plurality of raised bottom molds; first and second pressure receiving members; first and second fixing plates to which the first and second blow cavity split molds and the first and second pressure receiving members are respectively fixed; a third fixing plate interposed between the first and second fixing plates and to which the raised bottom molds are fixed at a first surface thereof; a pressure receiving rod extending down from a second surface; and a placement portion fixed to at least one of the first and second fixing plates and placing the third fixing plate thereon when the first and second blow cavity split molds are closed. The pressure receiving rod includes (Continued)

a first engaging portion engageable with a second engaging portion in a vertical direction.

5 Claims, 12 Drawing Sheets

(51) Int. Cl.
    *B29C 49/48*      (2006.01)
    *B29L 31/00*      (2006.01)
    *B29C 49/06*      (2006.01)
    *B29C 49/54*      (2006.01)
    *B29C 49/70*      (2006.01)

(52) U.S. Cl.
    CPC ............ *B29C 49/541* (2013.01); *B29C 49/70* (2013.01); *B29C 2049/283* (2013.01); *B29C 2049/4858* (2013.01); *B29C 2049/4869* (2013.01); *B29C 2049/4889* (2013.01); *B29L 2031/7158* (2013.01)

(56) References Cited

U.S. PATENT DOCUMENTS

| | | |
|---|---|---|
| 6,224,817 B1 | 5/2001 | Villers |
| 2005/0048155 A1 | 3/2005 | Tsau |
| 2005/0058741 A1 | 3/2005 | Fujii et al. |
| 2007/0048399 A1 | 3/2007 | Fields et al. |
| 2014/0099396 A1 | 4/2014 | Yokobayashi et al. |

FOREIGN PATENT DOCUMENTS

| | | |
|---|---|---|
| JP | A-H8-230027 | 9/1996 |
| JP | A-2005-066869 | 3/2005 |
| JP | A-2001-310374 | 11/2006 |
| JP | A-2009126129 | 6/2009 |
| JP | A-2011-156728 | 8/2011 |
| WO | WO-A1-2011-092985 A1 | 8/2011 |

OTHER PUBLICATIONS

Office Action dated Apr. 28, 2015 in a related Chinese patent application No. 201280052275.9 and English translation thereof.

\* cited by examiner

BLOW MOLD UNIT, BLOW MOLDING MACHINE AND METHOD FOR REPLACING BLOW MOLD UNIT

TECHNICAL FIELD

The present invention relates to a blow mold unit, a blow molding machine using the same and a method for replacing the blow mold unit.

BACKGROUND ART

In a blow molding machine, a mold must be replaced according containers to be blow molded. As a blow mold for blow molding a container from a preform, a pair of blow cavity split molds is necessary. In addition, in order that the bottom portion of a blow molded container can have a so called champagne bottom shape, a self-supporting bottle shape or a similar shape projecting inwardly, a raised bottom mold is necessary as a blow mold. Also, in some cases, separately from the pair of blow cavity split molds, a raised bottom mold which is clamped by the pair of blow cavity split molds is necessary.

Patent document 1 discloses a blow mold unit in which a pair of blow cavity and a raised bottom mold can be handled as an integral body when replacing molds.

CITATION LIST

Patent Document

Patent Document 1: JP-A-2011-156728

DISCLOSURE OF THE INVENTION

Problems that the Invention is to Solve

In an embodiment of the patent document 1, among one of first and second mold clamping plates to which a blow mold unit is fixed, one clamping plate is fixed and only the other clamping plate is driven. Since the raised bottom mold is supported on the fixed mold clamping plate, even when the first and second blow cavity split molds are opened during mold replacement, the raised bottom mold is prevented from falling off.

However, in a case of a blow mold unit mounted onto first and second mold clamping plates, which moves in line symmetry by a mold clamping/mold opening device of a blow molding machine, when the first and second mold clamping plates are opened, there exists no member for supporting the raised bottom mold from the lower side. Therefore, another member for preventing the raised bottom mold from falling off becomes necessary.

It is an object of the invention to provide a blow mold unit, which is to be mounted onto first and second mold clamping plates movable in line symmetry by the mold clamping/mold opening device of a blow molding machine, in which, even when first and second blow mold cavity split molds are opened during mold replacement, it is not necessary to add another member in order to prevent a raised bottom mold from falling off, a blow molding machine using the same, and a method for replacing the blow mold unit.

Means for Solving the Problems (1) One aspect of the invention relates to a blow mold unit to be connected to first and second mold clamping plates movable in line symmetry by a mold clamping/mold opening device of a blow molding machine and an elevation device of the blow molding machine, the blow mold unit including:

a blow mold including first and second blow cavity split molds to be clamped by bringing parting surfaces thereof into contact with each other, and a plurality of raised bottom molds that define a plurality of raised bottom shapes for a plurality of cavities defined by the first and second blow cavity split molds;

first and second pressure receiving plates that receive mold clamping pressure by bringing parting surfaces thereof into contact with each other;

a first fixing plate to which the first blow cavity split mold and the first pressure receiving plate are fixed and to be connected to the first mold clamping position;

a second fixing plate to which the second blow cavity split mold and the second pressure receiving plate are fixed and to be connected to the second mold clamping position;

a third fixing plate interposed between the first and second fixing plates and to which the plurality of raised molds are fixed at a first surface thereof;

a pressure receiving rod hanging down from a second surface of the third fixing plate opposed to the first surface; and a placement portion fixed to at least one of the first and second fixing plates and placing the third fixing plate thereon when the first and second blow cavity split molds are closed, wherein the pressure receiving rod includes an engaged portion engageable with an engaging portion, which is formed to an elevation rod of the elevation device, in a vertical direction.

According to the one aspect of the invention, when the blow mold unit is carried into and out from the blow molding machine, the first and second blow cavity split molds are closed. At such time, the third fixing plate for fixing the plurality of raised bottom molds is placed on the placement portion fixed to at least one of the first and second fixing plates. Thus, since not only the first and second blow cavity split molds and the first and second pressure receiving plates but also the plurality of raised bottom molds through the placement portion and third fixing plate are held the first and second fixing plates, they can be handled as an integral body during mold replacing. This blow mold unit is carried into the blow molding portion of the blow molding machine as an integral body. Further, when the first and second fixing plates are fixed to the first and second mold clamping plates of a mold clamping/mold opening device provided to the blow molding machine, and the first and second fixing plates are then opened, the engaged portion of the pressure receiving rod fixed to the third fixing plate is engaged with the engaging portion formed to the elevation rod of the elevation device provided to the blow molding machine in the vertical direction. Accordingly, the plurality of raised bottom molds, third fixing plate and pressure receiving rod are supported by the elevation rod. In this state, since the first and second blow cavity split molds are opened, an operation space can be secured, whereby the engaged portion of the pressure receiving rod and the engaging portion of the elevation rod can be connected to each other by the coupling member. In this way, the operation to mount the blow mold unit onto the blow molding machine is ended. The mold clamping drive of the plurality of raised bottom molds can be realized by driving the elevation rod extending from the third fixing plate by the elevation rod of the elevation device of the blow molding machine.

(2) In the one aspect of the invention, a tapered surface can be formed on at least one of the engaged portion of the pressure receiving rod and the engaging portion of the elevation rod, and the engaging portion can center and guide the engaged portion.

Since the tapered surface is formed on at least one of the engaged portion and engaging portion, the engagement between the engaged portion and engaging portion in the vertical direction can performed smoothly and the engaged portion can be centered at the position of the engaging portion.

(3) In the one aspect of the invention, the placement portion can include third and fourth pressure receiving plates that receive the mold clamping pressure by bringing the parting surfaces thereof into contact with each other, the third pressure receiving plate can be fixed to the first fixing plate, and the fourth pressure receiving plate can be fixed to the second fixing plate. Accordingly, the placement portion can also be used as a pressure receiving plate.

(4) In the one aspect of the invention, the first and second pressure receiving plates can each include: a roller rollingly contacting with a base of the blow molding machine; and a roller drive member that drives the roller to lower from an elevated position where the roller do not project from a lower-most surface of the blow mold unit to a lowered position where the roller rollingly contacts with the base.

Since this roller is set at the lowered position, by driving the roller of the blow mold unit to roll on the base of the blow molding machine in contact therewith, the blow mold unit can be mounted and removed. When the roller is lifted relatively after the blow mold unit is carried in to a given position, the blow mold unit is lowered, whereby a part of the engaged portion can be engaged with the engaging portion. After then, by driving the first and second fixing plates to open, while the engaged portion being guided by the engaging portion, the engaged state between the engaged portion and the engaging portion can be further promoted.

(5) In the one aspect of the invention, the first pressure receiving plate can be fixed to the first fixing plate at both sides of the first blow cavity split mold, the second pressure receiving plate can be fixed to the second fixing plate at both sides of the second blow cavity split mold, slide metals can be respectively fixed to the lower-most surfaces of the first and second pressure receiving plates, the slide metal can include a pin insertable into a hole formed in one of the lower-most surfaces of the first and second pressure receiving plates and a screw hole to which a bolt is threadedly engaged in one of the first and second pressure receiving plates, and the first and second pressure receiving plates can respectively include a hollow portion, a bolt hole can be formed to penetrate from an upper surface facing the hollow portion to the lower-most surface, and the bolt can be inserted into the bolt hole from the upper side and is threadedly engaged to the screw hole.

The slide metals are interposed between the lower-most surface of the blow mold unit and the base of the blow molding machine and are used to reduce the sliding friction of the blow mold unit on the base of the blow molding machine to thereby secure the smooth movement of the blow mold unit when the blow mold unit is closed, clamped and opened. The neck mold provided in the blow molding machine and first and second blow cavity split molds are temporarily clamped to determine whether the height of the first and second cavity split molds is proper or not. When not proper, the shim plates are inserted between the lower-most surfaces of the first and second pressure receiving plates and slide metals to thereby adjust the height of the blow mold unit. In this case, since the bolts for fixing the slide metals can be operated from the upper side of the base of the blow molding machine, the operating performance can be enhanced.

Further, when the blow mold unit including a roller is used, by setting the roller at its lowered position when adjusting the height of the blow mold unit, a clearance capable of inserting the shim plates between the lower-most surfaces of the first and second pressure receiving plates and slide metals can be easily secured.

(6) Another aspect of the invention relates to a blow molding machine including:

a base;

the above-described blow mold unit according which is supported on the base;

a mold clamping/mold opening device provided on the base and drives the first and second fixing plates of the blow mold unit to clamp/open the first and second blow cavity split molds; and an elevation device that drives an elevation rod to lift and lower the plurality of raised bottom molds of the blow mold unit.

According to the other aspect of the invention, due to the above-mentioned operation of the blow mold unit according to the one aspect, a burden on the operation to replace the blow mold unit can be reduced greatly.

(7) A further other aspect of the invention relates to a method for replacing a blow mold unit, the method including:

a step of carrying the above-described blow mold unit into between the first and second mold clamping plates movable in line symmetry by a mold clamping/mold opening device provided to a blow molding machine;

a step of fixing the first and second fixing plates of the blow mold unit to the first and second mold clamping plates of the mold clamping/mold opening device;

a step of driving the mold clamping/mold opening device to open the first and second blow cavity split molds; and a step of coupling together the pressure receiving rod and the elevation rod including the engaging portion engaged with the engaged portion of the receiving rod by a coupling member.

According to the further other aspect of the invention, the blow mold unit can be carried into the blow molding machine as an integral body. Also, when the first and second blow cavity split molds are opened during replacement of the blow mold unit, the engaged portion of the pressure receiving rod is engaged with the engaging portion formed in the elevation rod of the elevation device provided in the blow molding machine from the vertical direction. Thus, since the plurality of raised bottom molds, third fixing plate and pressure receiving rod are supported by the elevation rod, the clamping operation by the coupling after that can be executed easily.

(8) A further other aspect of the invention relates to a method for replacing a blow mold unit, the method including:

a step of carrying the above-described blow mold unit into between the first and second mold clamping plates movable in line symmetry by a mold clamping/mold opening device provided to a blow molding machine, while rolling the roller of the blow mold unit in contact with a base of the blow molding machine;

a step of fixing the first and second fixing plates of the blow mold unit to the first and second mold clamping plates of the mold clamping/mold opening device;

a step of driving the mold clamping/mold opening device to open the first and second blow cavity split molds; and a step of coupling together the pressure receiving rod and the elevation rod including the engaging portion engaged with the engaged portion of the receiving rod by a coupling member.

According to the further other aspect of the invention, the blow mold unit can be carried into the blow molding machine as an integral body and also in such a manner that its friction during the carry-in operation is reduced by the roller. After then, when the roller is set at its lifted position, the blow mold unit is lowered and a part of the engaged portion is engaged with the engaging portion. Next, when the first and second blow cavity split molds respectively connected to the mold clamping/mold opening device are opened, the engaged portion of the pressure receiving rod fixed to the third fixing plate is engaged with the engaging portion from the vertical direction while being guided by the engaging portion. Thus, since the plurality of raised bottom molds, third fixing plate and pressure receiving rod are supported by the elevation rod, the clamping operation by the coupling after that can be executed easily.

(9) In the further other aspect of the invention, the method can further include a step of temporarily clamping a neck mold provided to the blow molding machine and the first and second blow cavity split molds and determine whether a height of the first and second blow cavity split molds is proper or not, and when not proper, after the first and second blow cavity split molds are opened, loosening the clamped state between the first and second fixing plates and the first and second mold clamping plates, lowering the roller, and inserting shim plates into between the lower-most surfaces of the first and second pressure receiving plates and the slide metals, thereby adjusting a height of the blow mold unit.

According to the further other aspect of the invention, since the roller is set at the lowered position also when adjusting the height of the blow mold unit, a clearance capable of inserting the shim plates between the lower-most surfaces of the first and second pressure receiving plates and slide metals can be easily secured.

Effects of the Invention

According to the invention, there can be provided a blow mold unit, which is to be mounted on first and second mold clamping plates movable in line symmetry by the mold clamping/mold opening device of a blow molding machine, in which, even when first and second blow cavity split molds are opened during the mold replacing, it is not necessary to add another member in order to prevent the raised bottom mold from falling off, a blow molding machine using the same, and a method for replacing the blow mold unit.

BRIEF DESCRIPTION OF THE DRAWINGS

FIG. 9A shows a state where the blow mold unit is carried-in.

MODE FOR CARRYING OUT THE INVENTION

Hereinafter, preferred embodiments of the invention will be specifically described. Here, the embodiments described hereinafter do not limit the contents of the invention disclosed in the scope of the appended claims. All of structures described in the embodiments are not always essential as the solving means of the invention.

1. Blow Molding Machine

Figure 1:
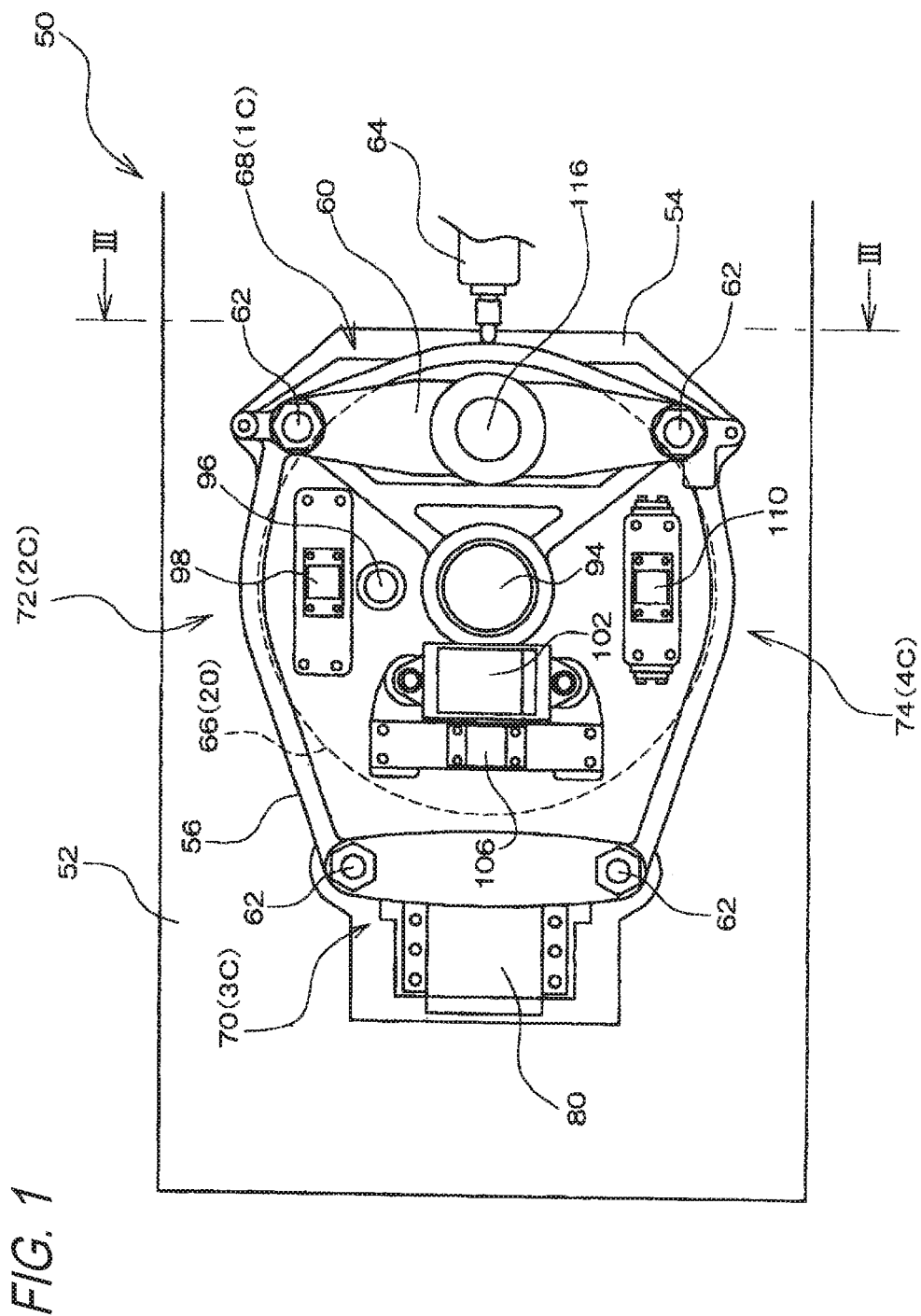
FIG. 1 is a plan view of a blow molding machine according to an embodiment of the invention.
Figure 2:
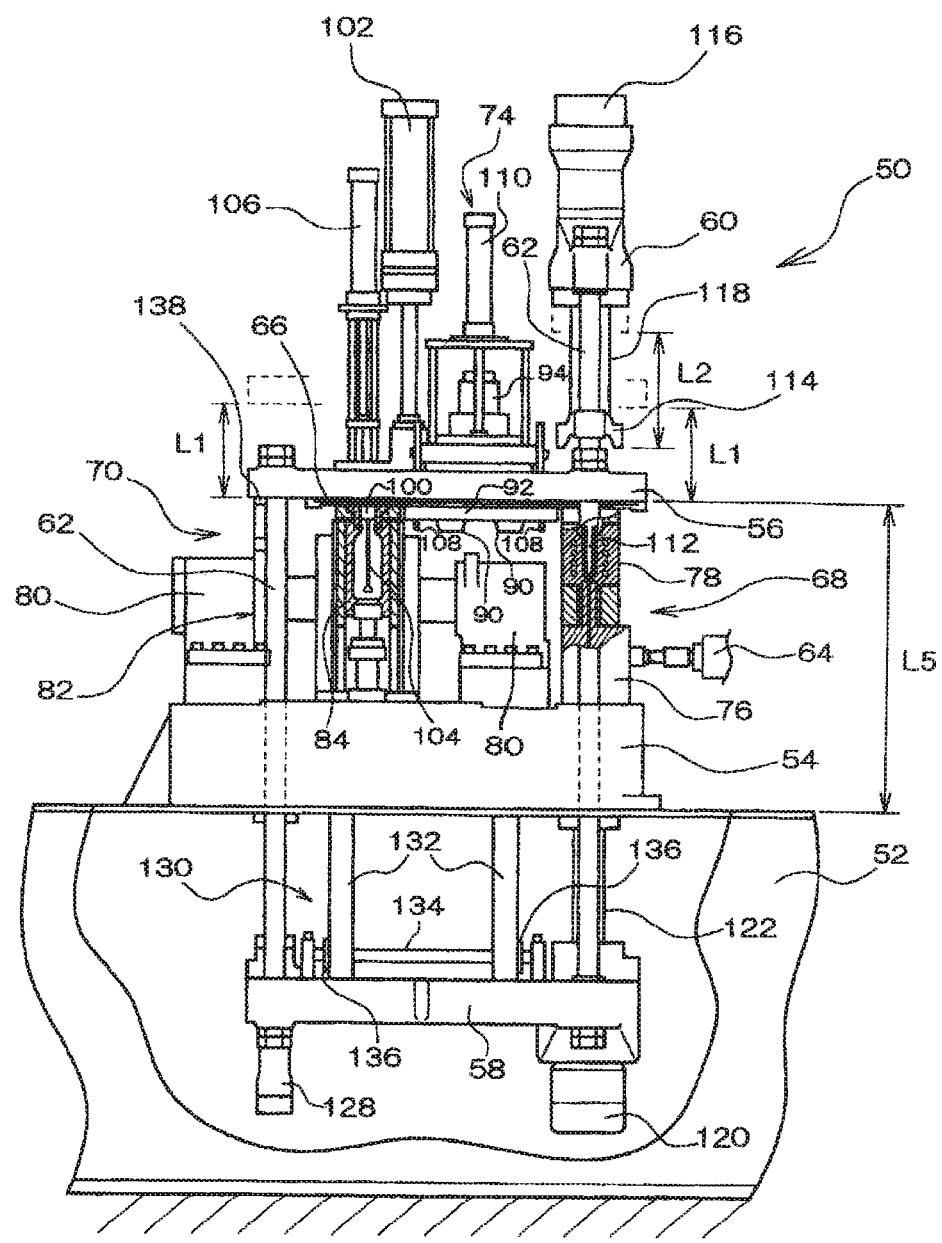
FIG. 2 is a partially broken front view of the blow molding machine shown in FIG. 1.
Figure 3:
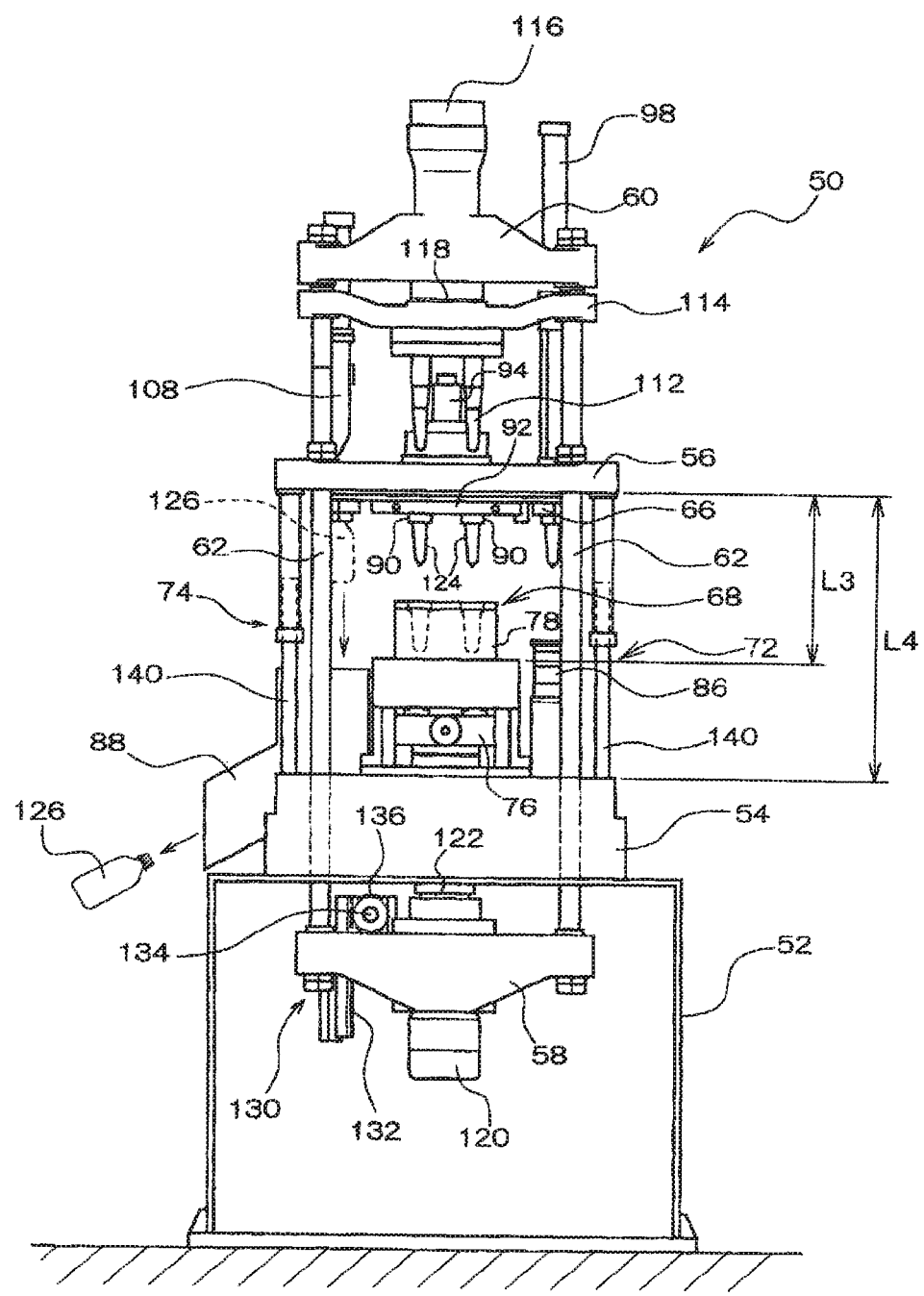
FIG. 3 is a section view taken along the line shown in FIG. 1.

Firstly, description is given of an example of a blow molding machine to which the invention is applied. FIG. 1 shows, for example, a blow molding machine 50 of four stations. The molding machine 50, as shown in FIGS. 2 and 3, includes a machine base 52, a lower base 54, an upper base 56, a traction plate 58, and a cylinder fixing plate 60, while the upper base 56, traction plate 58 and cylinder fixing plate 60 are connected and fixed by a plurality of, for example, four tie bars 62 (see FIG. 1) penetrating through the lower base 54.

The machine base 52 has a hollow box shape, while an injection apparatus 64 is mounted on one side of the upper surface of the machine base 52. The lower base 54 is fixed to the upper surface of the other side of the machine base 52. The upper base 56 is disposed above the lower base 54 with a given clearance between them and rotatably supports a rotary plate 66 on the lower surface side thereof.

The upper base 56 is also connected and fixed to intermediate positions of the two tie bars 62 on the injection apparatus 64 side and the upper ends of the two tie bars 62 on the opposite side to the injection apparatus 64.

A plurality of processing stations 1C~4C are arranged at the plurality of rotation stop positions of the rotary plate 66 existing in a space between the lower and upper bases 54 and 56 above the machine base 52. As shown in FIG. 1, an injection molding station 68(1C) is formed on the injection apparatus 64 side, a blow molding station 70(3C) is formed at a position opposite to the station 68(1C), and a temperature regulating station 72(2C) and a take-out station 74(4C) are formed at positions intersecting at 90° with the injection molding station 68 and blow molding station 70.

In the injection molding station 68, as shown in FIG. 2, an injection cavity mold 78 is mounted on the lower base 54 through a hot runner mold 76 nozzle-touchable with the injection apparatus 64.

In the blow molding station 70, similarly as shown in FIG. 2, there is provided on the lower base 54 a blow mold 84 constituted of a split mold which can be mold clamped by a blow mold clamping mechanism (mold clamping/mold opening device) 82 including a blow mold clamping cylinder 80. Here, a raised bottom mold is not shown in FIG. 2.

In the temperature regulating station 72, as shown in FIG. 3, a temperature regulating pot 86 is fixed to the top of the lower base 54.

In the take-out station 74, as shown in FIG. 3, a shooter 88 for taking out a molded product is mounted on the lower base 54.

On the lower surface of the rotary plate 66, a plurality of, for example, two neck molds 90 are arranged respectively according to the respective positions of the injection molding station 68, temperature regulating station 72, blow molding station 70 and take-out station 74.

The neck molds 90 are respectively constituted of split molds and are respectively mounted on neck support plates 92 constituted of split plates, while the neck molds 90 can be opened and closed by opening and closing the neck support plates 92. In the injection stretch blow molding machine 50, the neck molds 90 and neck support plates 92 for supporting the same openably and closably constitute a transfer member to be supported by the rotary plate 66.

The rotary plate 66 can be rotated intermittently by 90° by an electric motor 94 provided on the upper plate 56 and is capable of transferring sequentially the neck molds 90 to the injection molding station 68, temperature regulating station 72, blow molding station 70 and take-out station 74.

Here, the rotation stop position of the rotary plate 66 is determined by a positioning mechanism 96. However, it may also be determined only by the positioning means of a servo motor.

On the upper base 56, there are provided, for example, a temperature regulating core elevating cylinder 98 situated at the corresponding position of the temperature regulating station 72 for lifting and lowering a temperature regulating core (not shown), a blow core mold elevating cylinder 102 situated at the corresponding position of the blow molding station 70 for lifting and lowering a blow core mold 100 and a stretch rod elevating cylinder 106 for lifting and lowering a stretch rod 104, and an eject cam elevating cylinder 110 situated at the corresponding position of the take-out station 74 for lifting and lowering an eject cam 108 for opening the neck support plates 92.

The cylinder fixing plate 60 is fixed to the upper ends of the two tie bars 62 situated on the injection molding station 68 side above the upper base 56 and, between the cylinder fixing plate 60 and upper base 56, there is interposed an injection core mold clamping plate 114 with an injection core mold 112 mounted thereon in such a manner that it can be lifted and lowered along the two tie bars 62. Here, a cooling medium circulates in the injection core mold 112 but description is omitted of a device for circulating the cooling medium.

Also, on the cylinder fixing plate 60, there is mounted an injection core mold clamping cylinder 116, while the leading end of the piston 118 of the injection core mold clamping cylinder 116 is connected to the injection core mold clamping plate 114.

The traction plate 58 is connected and fixed to the lower ends of the four tie bars 62 within the machine base 52. On the traction plate 58, at a position below the injection molding station 68, there is mounted a neck mold clamping cylinder 120 serving as vertical mold clamping means, while the piston 122 of the neck mold clamping cylinder 120 is connected to the lower surface of the lower base 54. Here, the vertical mold clamping mechanism of the upper base 56 is configured by the traction plate 58, tie bars 62 and cylinder 120.

Therefore, as shown in FIG. 3, in a state where the traction plate 58 is lifted, when the neck mold clamping cylinder 120 is driven, with the lowering motion of the traction plate 58, the tie bars 62 are towed and lowered and, as shown in FIG. 2, the upper base 56 connected and fixed to the tie bars 62 is lowered by an amount equivalent to a stroke L1. Thus, the neck mold 90 mounted on the rotary plate 66 is lowered and, for example, in the injection molding station 68, the neck mold 90 is mold-clamped relative to the injection cavity mold 78.

Here, on the blow molding station 70 side, the lower surface of the upper base 56 is contacted with a stopper 138 provided on the upper portion of the blow mold clamping mechanism 82 and is positioned at the lower limit position of the upper base 56.

Further, in the temperature regulating station 72 and blow molding station 70, the blow mold 84 is clamped to the neck mold 90 by the temperature regulating pot 86 and blow mold clamping mechanism 82.

Simultaneously when the upper base 56 lowers, the cylinder fixing plate 60 fixed to the upper ends of the two tie bars 62 on the injection molding station 68 side lowers by the same stroke L1 as the upper base 56.

In this state, in the injection molding station 68, by driving the injection core mold clamping cylinder 116, the injection core mold clamping plate 114 is lowered by a stroke L2 to thereby clamp the injection core mold 112 and neck mold 90, and the injection apparatus 64 injects molten resin into the injection cavity mold 78 to injection mold a preform 124.

In this case, since the injection core mold clamping cylinder 116 lowers integrally with the upper base 56 with the lowering motion thereof, it can keep the distance constant with respect to the upper base 56.

Therefore, since the lowering stroke L2 of the injection core mold clamping cylinder 116 provides the smallest stroke between the retreating position of the injection core mold 112 from the rotary plate 66 and the clamping position, the length of the injection core mold clamping cylinder 116 can be shortened.

Also, since the injection core mold clamping cylinder 116 may only provide a mold clamping force capable of clamping the injection core mold 112, the injection core mold clamping cylinder 116 can be formed to have a relatively small size.

Here, simultaneously with the molding operation of the injection molding station 68, in the temperature regulating station 72, the temperature regulating core elevating cylinder 98 is operated to insert a temperature regulating core (not shown) into the temperature regulating pot 86 to regulate the temperature of the preform 124.

Also, in the blow molding station 70, the blow core mold elevating cylinder 102 is operated to lower the blow core mold 100 to thereby clamp the blow core mold 100 to the neck mold 90; and, the stretch rod elevating cylinder 106 is operated to lower the stretch rod 104 to supply blow air into the blow mold 84, whereby the temperature regulated preform 124 is two-axis stretch blown to mold a bottle 126.

Further, in the take-out station 74, the eject cam 108 is lowered by the eject cam elevating cylinder 110 to open the neck mold 90 through the neck support plate 92, the bottle 126 is dropped down, and the bottle 126 is discharged out of the apparatus by the shooter 88. Here, since a pair of split plates constituting the neck support plate 92 is normally closed by a spring, the neck mold 90 is held in a mold clamped state. Also, the paired split plates include unshown wedge holes respectively formed in their two end portions in the longitudinal direction thereof. The opening of the neck mold 90 is attained by lowering the eject cam 108 (which is driven by the eject cam elevating cylinder 110) toward the wedge holes to open the split plates.

Next, after the respective molding processes are ended, the blow mold clamping mechanism 82 is operated to open the blow mold 84; the neck mold clamping cylinder 120 is operated to elevate the upper base 56; and the injection core mold clamping cylinder 116, temperature regulating core elevating cylinder 98, blow core mold elevating cylinder 102, stretch rod elevating cylinder 106 and eject cam elevating cylinder 110 are operated to retreat the injection core mold 112, temperature regulating core, blow core mold 100, stretch rod 104 and eject cam 108 from their positions in the rotary plate 66, whereby the rotary plate 66 becomes rotatable.

In this state, when the electric motor 94 is operated to rotate the rotary plate 66 intermittently, the processings in the respective processing stations can be carried out sequentially.

Also, at a position below the blow molding station 70 of the traction plate 58, there is provided an auxiliary mold clamping cylinder 128. The leading end of a piston (not shown) of the auxiliary mold clamping cylinder 128 is connected to the lower base 54 to enable the elevating and lowering motion of the upper base 56 to balance well on the injection molding station 68 side and on the blow molding station 70, whereby it can be lifted and lowered smoothly.

Further, the machine base 52 includes synchronizing means 130 for synchronizing the neck mold clamping cylinder 120 and auxiliary mold clamping cylinder 128.

The synchronizing means 130 includes two racks 132 respectively hanging down on the injection molding station 68 side and blow molding station 70 side of the lower base 54, a rotation shaft 134 stretched between the injection molding station 68 and blow molding station 70 of the traction plate 58, and two pinions 136 fixed to the rotation shaft 134 and meshing with the respective racks 132. Here, in the injection molding station 68 as well, there is provided a stopper rod 140 for restricting supplementary the lowering limit of the upper base 56.

Here, a blow mold unit 200 to be described below can be applied not only to the four-station blow molding machine 50 described above using FIGS. 1 to 3 but also to a three-station blow molding machine of a rotary transfer type, and a blow molding machine for linearly transferring a preform and a container. It can also be applied to an injection blow molding machine not requiring a stretch processing.

2. Blow Mold Unit

Figure 4:
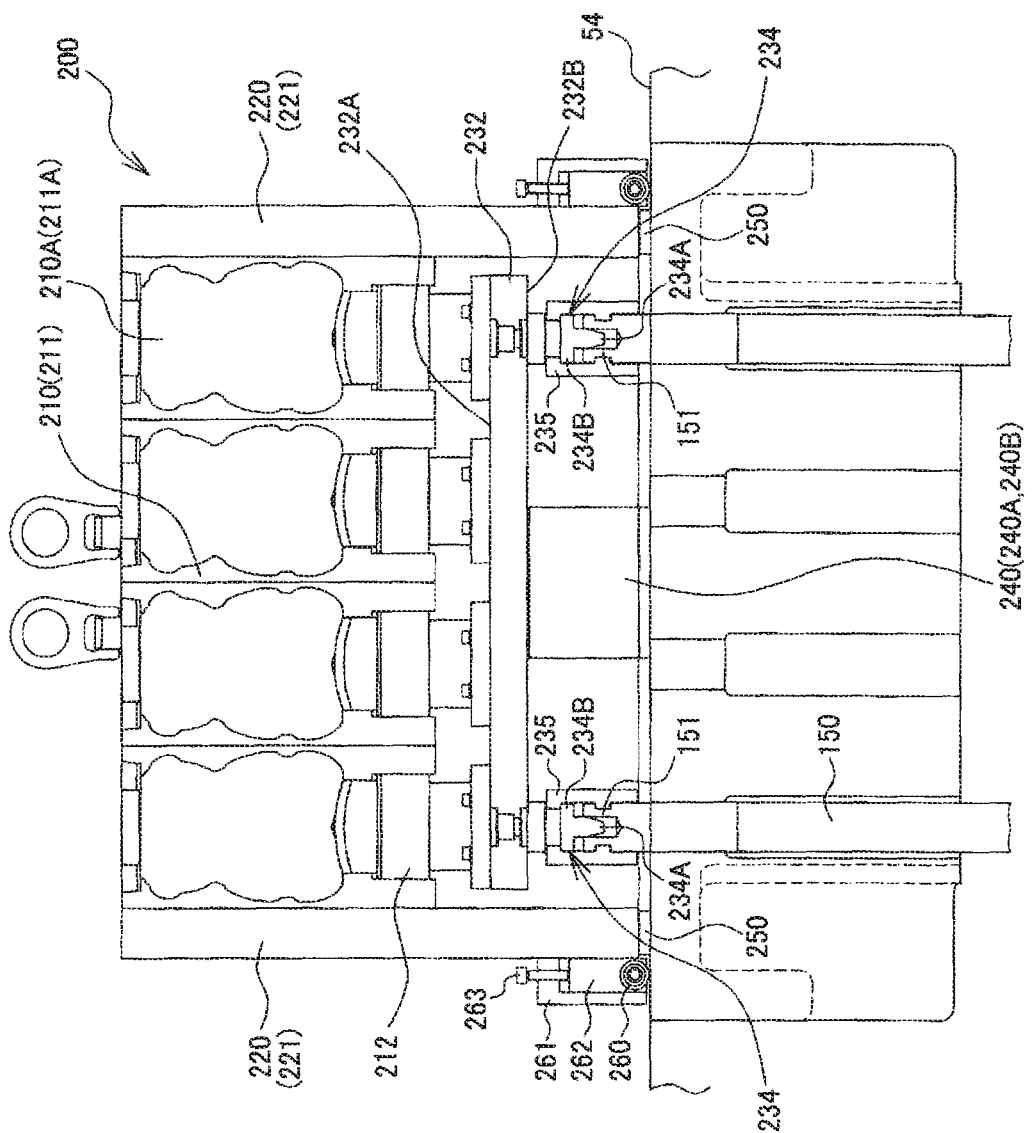
FIG. 4 is a front view of a blow mold unit.
Figure 5:
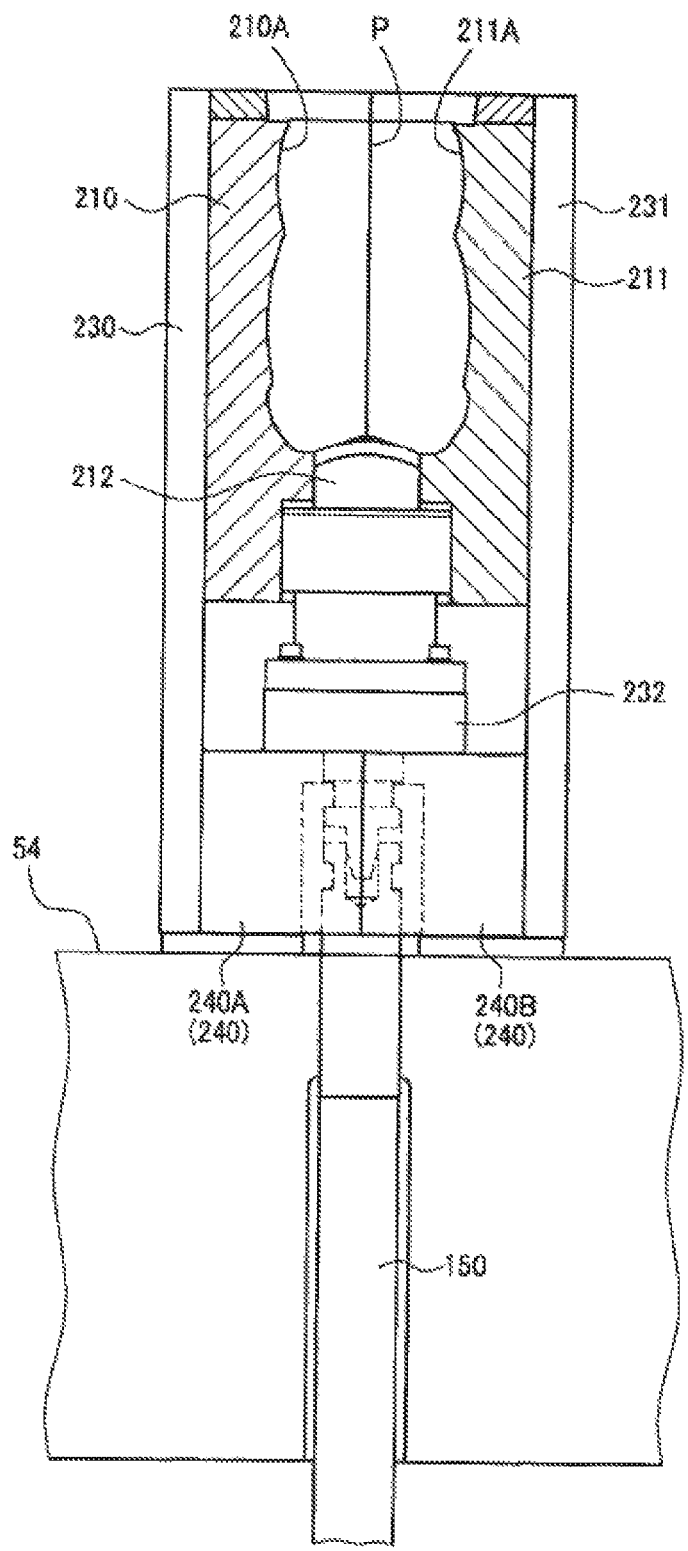
FIG. 5 is a side view of the blow mold unit.
Figure 6:
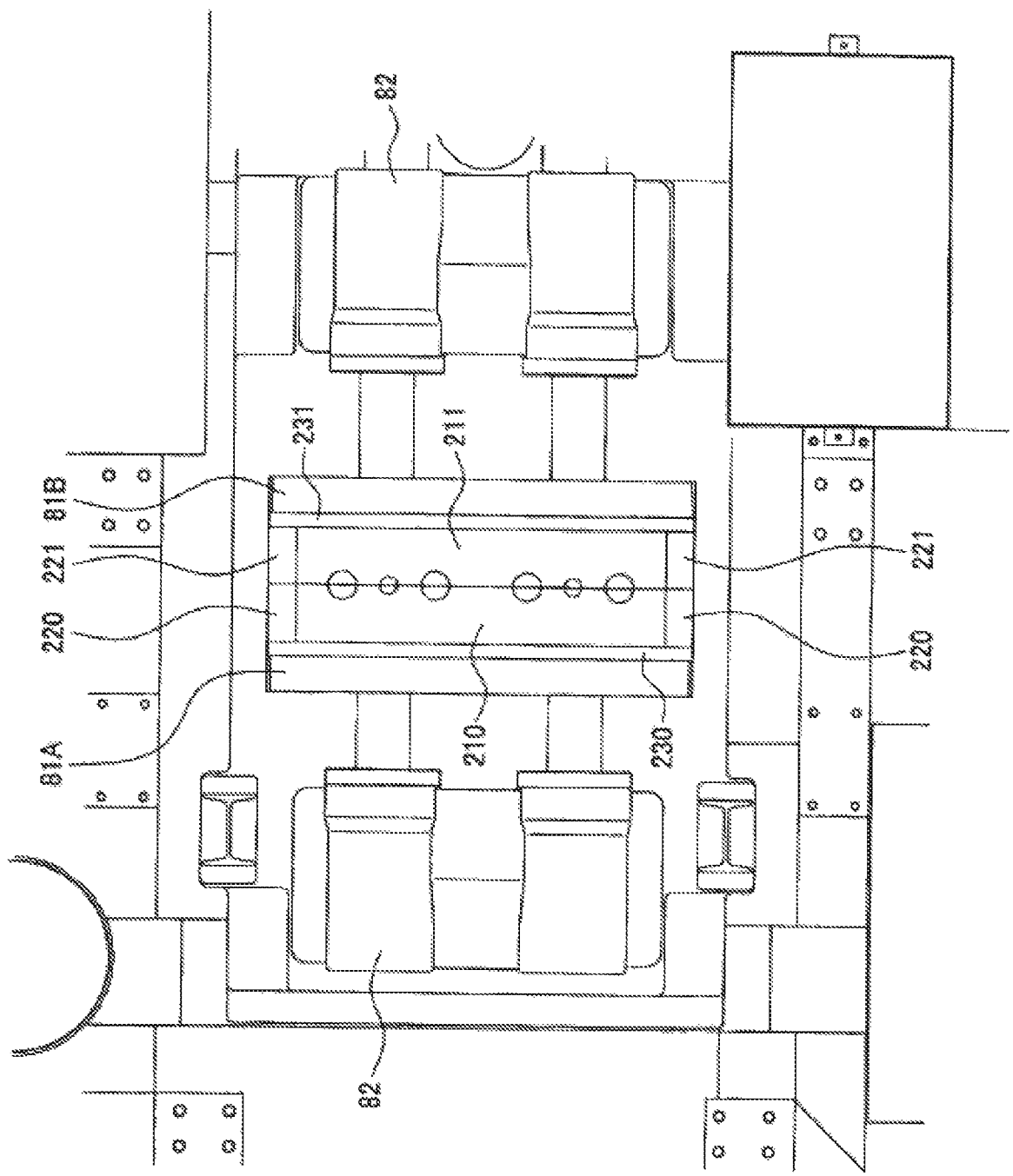
FIG. 6 is a plan view of the blow mold unit.

Next, description is given of a blow mold unit 200 with reference to FIGS. 4 to 8. FIGS. 4 to 6 are respectively a front view, a side view and a plan view of a blow mold unit 200 mounted on the blow molding machine 50. In FIGS. 4 and 5, as the structural components of the blow molding machine 50, there are shown the lower base (base) 54 shown in FIG. 2 and, for example, two elevation rods 150 provided to an elevation device such as a hydraulic cylinder. In FIG. 6, there are shown first and second mold clamping plates 81A, 81B to be driven by a mold clamping/mold opening device 82 shown in FIG. 2.

In the blow mold unit 200 shown in FIGS. 4 to 6, the blow mold 84 shown in FIG. 2 includes first and second blow cavity split molds 210 and 211, and a raised bottom mold 212. The first and second blow cavity split molds 210 and 211 respectively have cavities 210A and 211A respectively corresponding to the outer shapes of containers. The first blow cavity split mold 210, as shown in FIG. 4, has a plurality of, for example, four cavities 210A. The second blow cavity split mold 211 also has plurality of, for example, four cavities 211A. As shown in FIG. 4, in the four cavities 210A, 211A provided by the first and second blow cavity split molds 210 and 211, there are provided four raised bottom molds 212 which define the shape of the raised bottom.

In FIG. 4, the first blow cavity split mold 210 includes first pressure receiving plates 220, 220 on both sides thereof. Similarly, the second blow cavity split mold 211 includes second pressure receiving plates 221, 221 on both sides thereof. The first, second blow cavity split molds 210, 211 and first, second pressure receiving plates 220, 221 are clamped by bringing their parting surfaces P into contact with each other. The first and second pressure receiving plates 220 and 221 receive mold clamping pressure.

As shown in FIG. 5, the blow mold unit 200 includes a first fixing plate 230 to which the first blow cavity split mold 210 and first pressure receiving plate 220 are fixed, and a second fixing plate 231 to which the second blow cavity split mold 211 and second pressure receiving plate 221 are fixed.

As shown in FIGS. 4 and 5, the blow mold unit 200 includes a third fixing plate 232 interposed between the first and second fixing plates 230 and 231 and having a first surface 232A to which a plurality of raised bottom molds 212 are fixed. To a second surface 232B of the third fixing plate 232 opposed to the first surface 232A, there are fixed at least one, for example, two pressure receiving rods 234 hanging down from the second surface 232B. The leading ends (engaged portions) 234A of the two pressure receiving rods 234 can be formed, for example, in a tapered pin shape. Also, the pressure receiving rod 234 of this embodiment includes a flange 234B existing above the engaged portion 234A. The flange 234B functions as the lower limit stopper of the pressure receiving rod 234.

Also, the two elevation rods 150 of the elevation device provided to the blow molding machine 50 respectively include, at their leading ends, recessed portions (engaging portions) 151 for receiving the engaged portions 234A of the pressure receiving rods 234. The engaging portions 151 and the engaged portions 234A are coupled to each other by their respective coupling members 235, and can be lifted and lowered integrally. Thus, when the elevation rods 150 are lifted and lowered, the plurality of raised bottom molds 212, third fixing plates 232 and pressure receiving rods 234 are lifted and lowered as an integral body.

As shown in FIGS. 4 and 5, there is formed a placement portion 240 which is removably fixed to at least one of the first and second fixing plates 230 and 231 and on which the third fixing plate 232 is placed when the first and second blow cavity split molds 210 and 211 are closed. In this embodiment, the placement portion 240 is constituted of third and fourth pressure receiving plates 240A and 240B capable of receiving mold clamping pressures when the parting surfaces thereof are brought into contact with each other. The third pressure receiving plate 240A is fixed to the first fixing plate 230, while the fourth pressure receiving plate 240B is fixed to the second fixing plate 231. Thus, the placement portion 240 is also used as the third and fourth pressure receiving plates 240A and 240B. Also, in order to form the container bottom portion shape to be better, in some cases, in the blow molding operation, the operation timing of the raised bottom mold is delayed and the raised bottom mold is elevated over a longer stroke than a normal stroke. In this case, the placement portion 240 may also be formed to have a lowered height, may be disposed in a position where it does not interfere with the elevation rods 150, or may be formed at the two side surfaces (pressure receiving plates 220, 221 side) of the blow mold. Here, as will be described later, the main function of the placement portion 240 is to prevent the third fixing plate 232 from falling off, and the pressure receiving function is not always essential.

According to this embodiment, when the blow mold unit 200 is carried into the blow molding machine 50, the first and second blow cavity split molds 210 and 211 are closed. While the first and second blow cavity split molds 210 and 211 are closed, the third fixing plate 232 for fixing the plurality of raised bottom molds 212 thereto, as shown in FIG. 5, is placed on the placement portion 240 (third and fourth pressure receiving plates 240A and 240B) fixed to at least one, for example, both of the first and second fixing plates 230 and 231. Thus, by the first and second fixing plates 230 and 231, not only the first and second blow cavity split molds 210, 211, first and second pressure receiving plates 220, 221, but also the plurality of raised bottom molds 212 through the placement portion 240 (third and fourth pressure receiving plates 240A and 240B) and third fixing plate 232 are held. This enables the blow mold unit 200 to be handled as an integral body during the mold replacing.

Figure 7A:
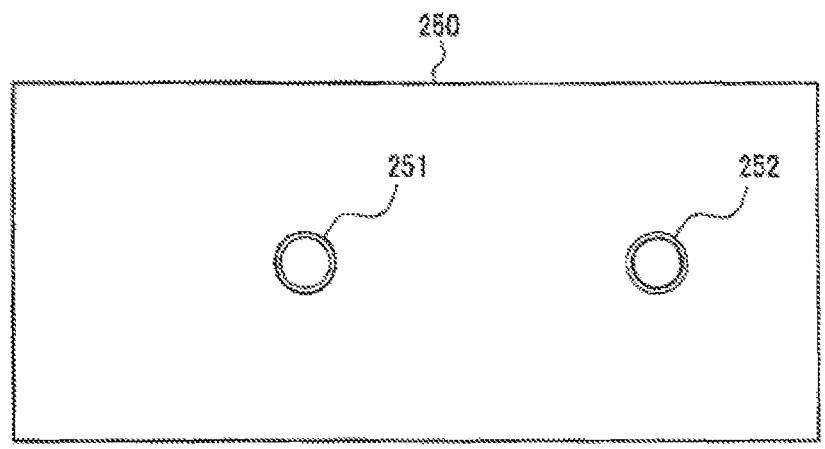
FIGS. 7A and 7B are a front view and a plan view of a slide metal respectively.
Figure 7B:
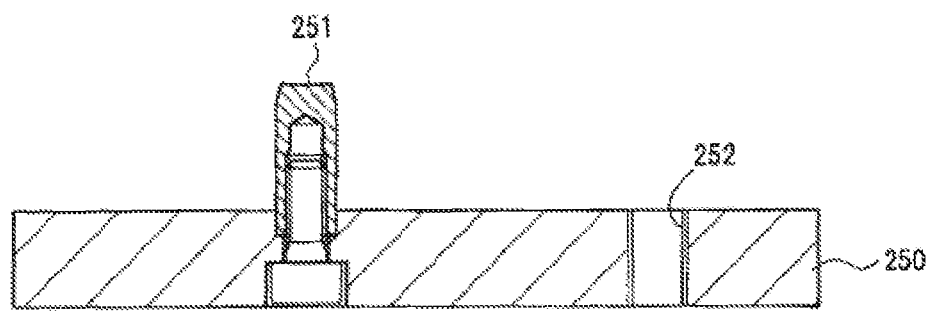

Here, as shown in FIG. 4, to the lower surfaces of the first and second pressure receiving plates 220, 221, slide metals 250 shown in FIGS. 7A and 7B are fixed. The slide metals 250 are used to reduce friction resistance when opening and closing the blow mold unit on the lower base 54 and are made of, for example, oil impregnated metal. As shown in FIGS. 7A and 7B, vertically extending pins 251 are fixed to the slide metals 250 and screw holes 252 are formed in the slide metals 250.

Figure 8:
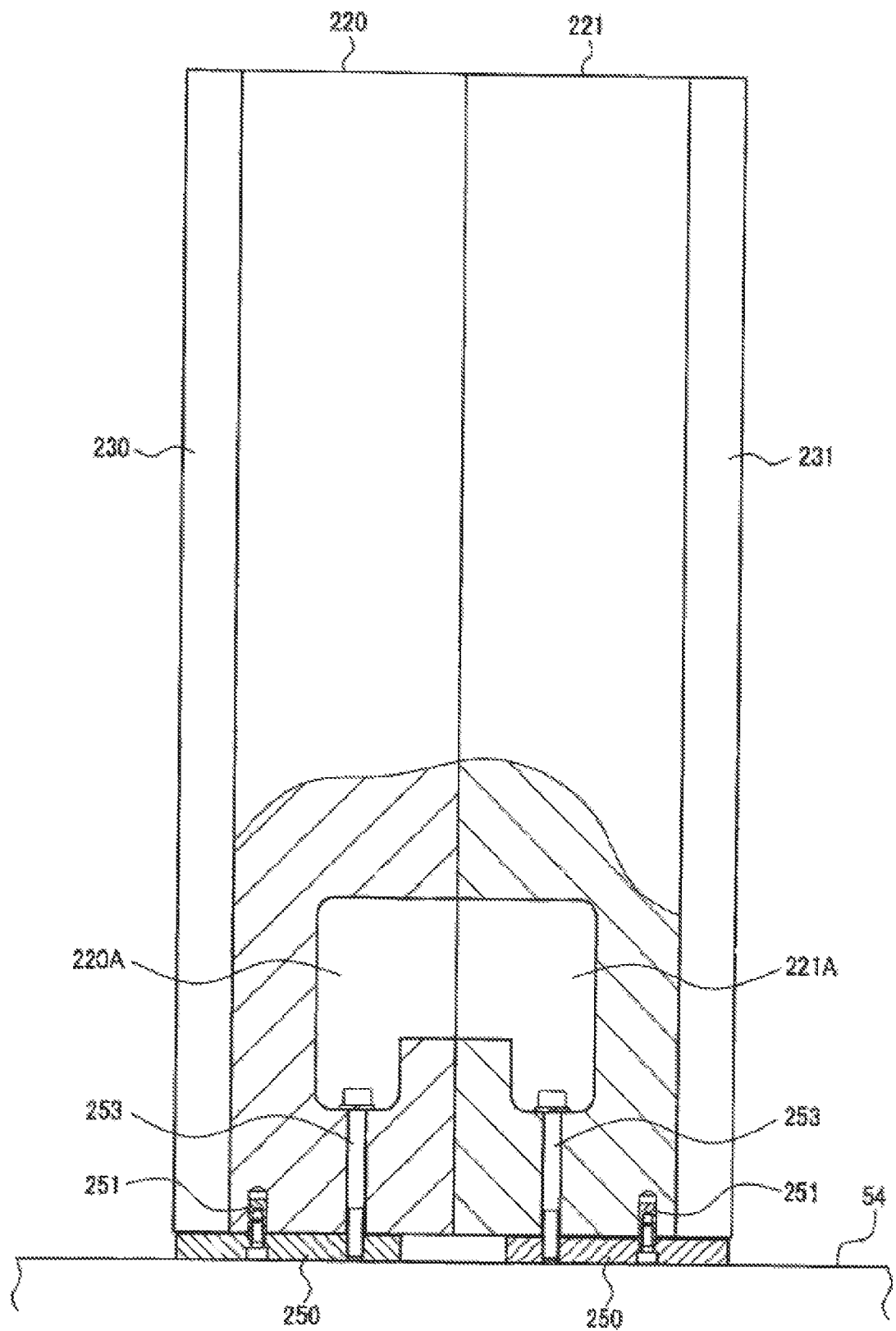
FIG. 8 is a side view of the blow mold unit, showing the mounted state of the slide metals.

In the slide metals 250, as shown in FIG. 8, the pins 251 are inserted from the lower side into positioning holes formed in the first and second pressure receiving plates 220 and 221, and bolts 253 inserted into bolt holes from the upper side by using holes (hollow portions) 220A and 221A formed in the first and second pressure receiving plates 220 and 221 are threadedly engaged into the screw holes 252 of the slide metals 250.

Also, as shown in FIG. 4, rollers 260 are supported on the side surfaces of the first and second pressure receiving plates 220 and 221 in such a manner that they can be moved back and forth from the lower-most surfaces of the blow mold unit 200 (the lower surfaces of the slide metals 250). For this purpose, housings 261 each having an L-shaped section are fixed to the side surfaces of the first and second pressure receiving plates 220 and 221. The rollers 260 rotatably supported by movable blocks 262 are stored within the housings 261. Bolts 263 are threadedly engaged with the upper portions of the housings 261. By fastening the bolts 263, the rollers 260 can be pressed down integrally with the movable blocks 262. The movable blocks 262 and bolts 263 are an example of a drive member for setting the rollers 260 at the lowered position.

Figure 9A:
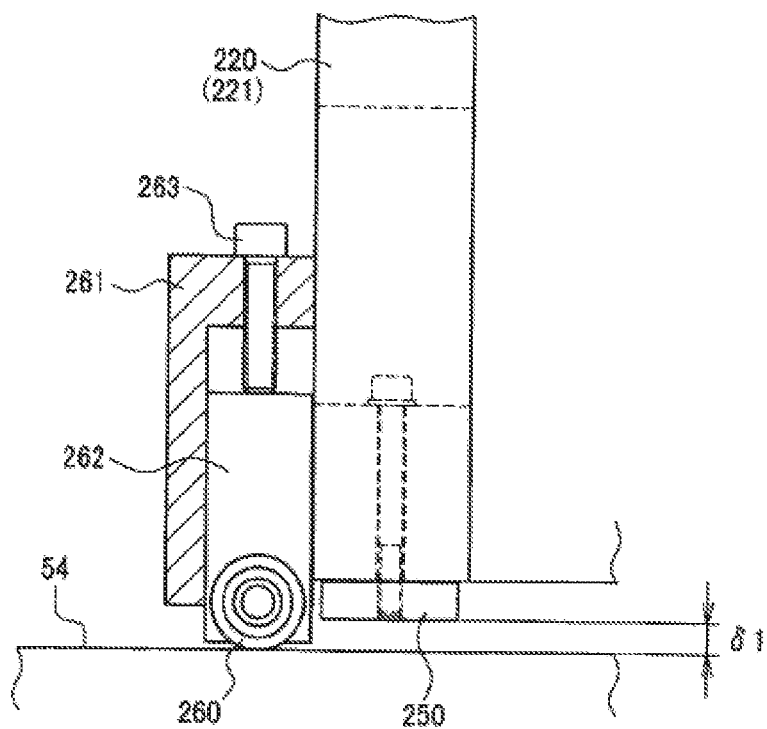

FIG. 9A shows a state where the roller 260 is pressed down. In this case, since the roller 260 rotates in contact with the lower base 54, a clearance $\delta1$ is formed between the lower-most surface (lower surface of the slide metal 250) of the blow mold unit 200 and lower base 54. Therefore, by pressing down the roller 260, in the blow mold unit 200, while rolling in contact with the lower base 54, the roller 260 is able to move on the lower base 54 with reduced friction.

3. Blow Mold Unit Mounting Method

As shown in FIG. 9A, by pressing down the roller 260, the blow mold unit 200 is integrally moved on the lower base 54 and is carried into the blow molding portion of the blow molding machine 50. Here, if a removable positioning pin is provided on the lower base 54 and an engaging portion corresponding to the shape of the positioning pin on the blow mold unit is provided, since they serve as a guide, the positioning adjustment of the blow molt unit can be facilitated. After then, by loosening the bolt 263 shown in FIG. 9A, due to the weight of the blow mold unit 200, the roller 260 is stored into the housing 261. Accordingly, the blow mold unit 200 lowers by a stroke $\delta1$ from the state of FIG. 9A and the slide metals 250 are brought into contact with the lower base 54. After then, the mold clamping/mold opening device 82 provided to the blow molding machine 50 is driven to bring the first and second mold clamping plates 81A and 81B into contact with the first and second fixing plates 230 and 231. At this time, the first and second mold clamping plates 81A and 81B may also be bolt fixed to the first and second fixing plates 230 and 231 in advance. Also, if necessary, the elevation rod 150 may be lifted in advance.

Figure 10:
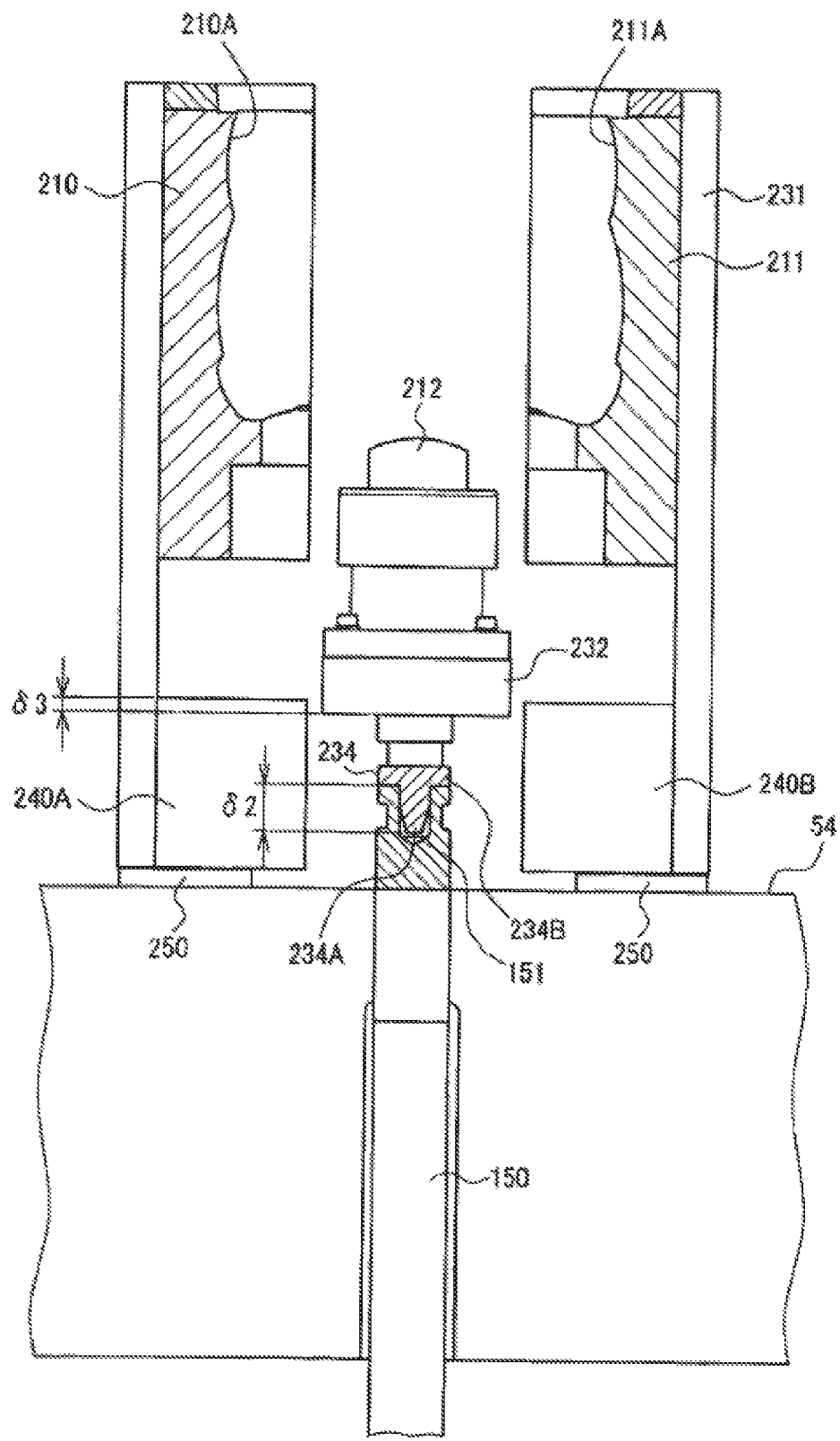
FIG. 10 is a section view showing the opened states of first and second blow cavity split molds while the blow mold unit is being mounted.

Next, when the mold clamping/mold opening device 82 is driven to open the first and second fixing plates 230 and 231, as shown in FIG. 10, the placement portion 240 is removed from lower side the third fixing plate 232. However, in this case, since the engaged portion 234A of the pressure receiving rod 234 is engaged with the recessed portion (engaging portion) 151 of the elevation rod 150, the third fixing plate 232 is prevented from falling off.

In this embodiment, as shown in FIG. 10, when the placement portion 240 is removed from the lower side of the third fixing plate 232, the flange 234B of the pressure receiving rod 234 is set at a lower limit position where it is brought into contact with the upper end face of the elevation rod 150. In this case, the engaged portion 234A is engaged into the recessed portion (engaging portion) 151 of the elevation rod 150 by a depth $\delta2$. At this time, the third fixing plate 232 and pressure receiving rod 234 have lowered by $\delta3$ from the upper surface of the placement portion 240. Here, the setting of the lower limit position is not limited to the flange 234B but, for example, such setting may also be realized only by the engaged portion 234A and engaging portion 151, for example, the lower position may also be defined by the depth of the engaging portion 151 configured by a recessed portion.

By storing the roller 260 from the state shown in FIG. 9A into the housing 261 to lower the blow mold unit 200, the pressure receiving rod 234 with its lowering motion limited to $\delta3$ by the placement portion 240 can bring a part of the engaged portion 234A thereof into engagement into the recessed portion (engaging portion) 151 of the elevation rod 150 in advance by a depth of ($\delta2$-$\delta3$). Thus, after then, when the first and second blow cavity split molds 210 and 211 connected to the mold clamping/mold opening device 82 are opened, the engaged portion 234A fixed to the third fixing plate 232 lowered by $\delta3$ is engaged into the engaging portion 151 from the vertical direction while being guided by the engaging portion 151, thereby providing a state shown in FIG. 10.

Here, the roller 260 is not always necessary. For example, when the first and second fixing plates 230 and 231 are opened as shown in FIG. 10, the third fixing plate 232 no longer supported by the placement portion 240 may be dropped by the stroke $\delta3$ to thereby realize the engagement between the engaged portion 234A and the recessed portion (engaging portion) 151. In this case, with respect to the engagement depth $\delta2$, the relation of $\delta2=\delta3$ is established. Or, before the first and second fixing plates 230 and 231 are opened as shown in FIG. 10, the elevation rod 150 may be elevated to thereby realize the engagement between the engaged portion 234A and engaging portion 151.

As described above, in the case of the engagement between the engaged portion 234A and recessed portion (engaging portion) 151, when the engaged portion 234A has a tapered pin shape, the guide function and centering function in the engagement are performed, thereby being able to correct the slight position shift of the third fixing plate 232. However, the guide function and centering function can be realized so long as at least one of the engaged portion 234A and engaging portion 151 has a tapered surface. Therefore, instead of, or, in addition to the engaged portion 234A of the tapered pin, the engaging portion 151 may also be formed of a tapered hole. Or, the engaged portion 234A may be formed of a tapered hole and, instead of this, or, in addition to this, the engaging portion 151 may be formed of a tapered pin.

Next, as shown in FIG. 4, the pressure receiving rod 234 and elevation rod 150 are coupled to each other by the coupling member 235. This ends the mounting of the blow mold unit 200. The coupling member 235 is constituted of two half-divided members which can be opened and closed. The coupling member 235 surrounds and clamps the engaged portion 234A, flange 234B and engaging portion 151. However, the coupling member 235 is not limited to this structure. In this embodiment, it is necessary to couple the coupling member 235 in a state shown in FIG. 4 where the pressure receiving rod 234 has been elevated by δ3 or more from the state of FIG. 10. Accordingly, even when the first and second blow cavity split molds 210 and 211 are closed, interference between the third fixing plate 232 and placement portion 240 can be prevented. Thus, it is necessary to lift the raised bottom mold 212, third fixing plate 232 and pressure receiving rod 234. However, since their total weight is small when compared with the total weight of the first and second blow cavity split molds 210 and 211, first and second pressure receiving plates 220 and 221 and first and second fixing plates 230 and 231, the workload can be greatly reduced when compared with prior art. Here, since the placement portion 240 is necessary when mounting the blow mold unit 200, after the mounting of the coupling member 235 is ended, the placement portion 240 may be removed. However, as in this embodiment, when the placement portion 240 is used also as the third and fourth pressure receiving plates 240A and 240B, it is not necessary to remove the placement portion 240.

4. Blow Mold Unit Height Adjusting Method

Figure 9B:
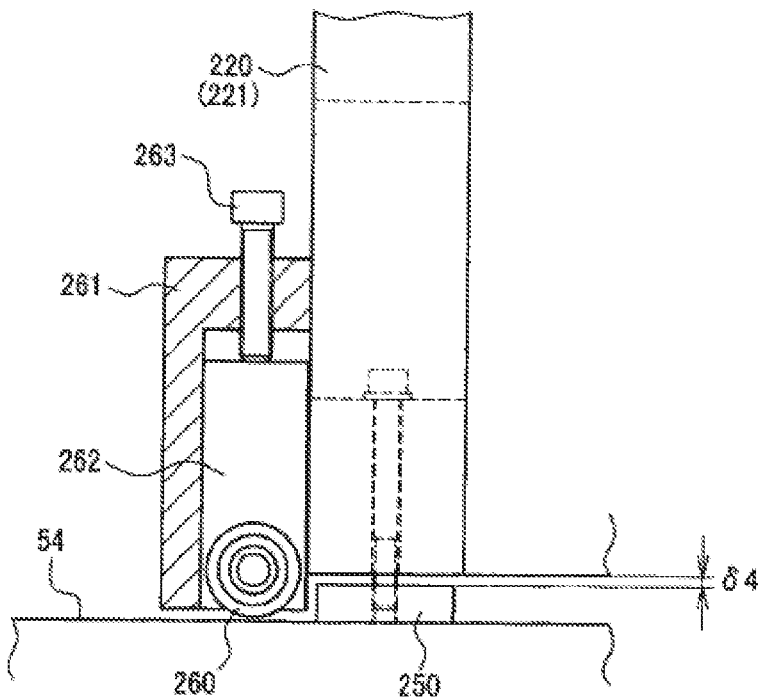
FIG. 9B is an explanatory view of a blow mold unit height adjusting step.
Figure 11:
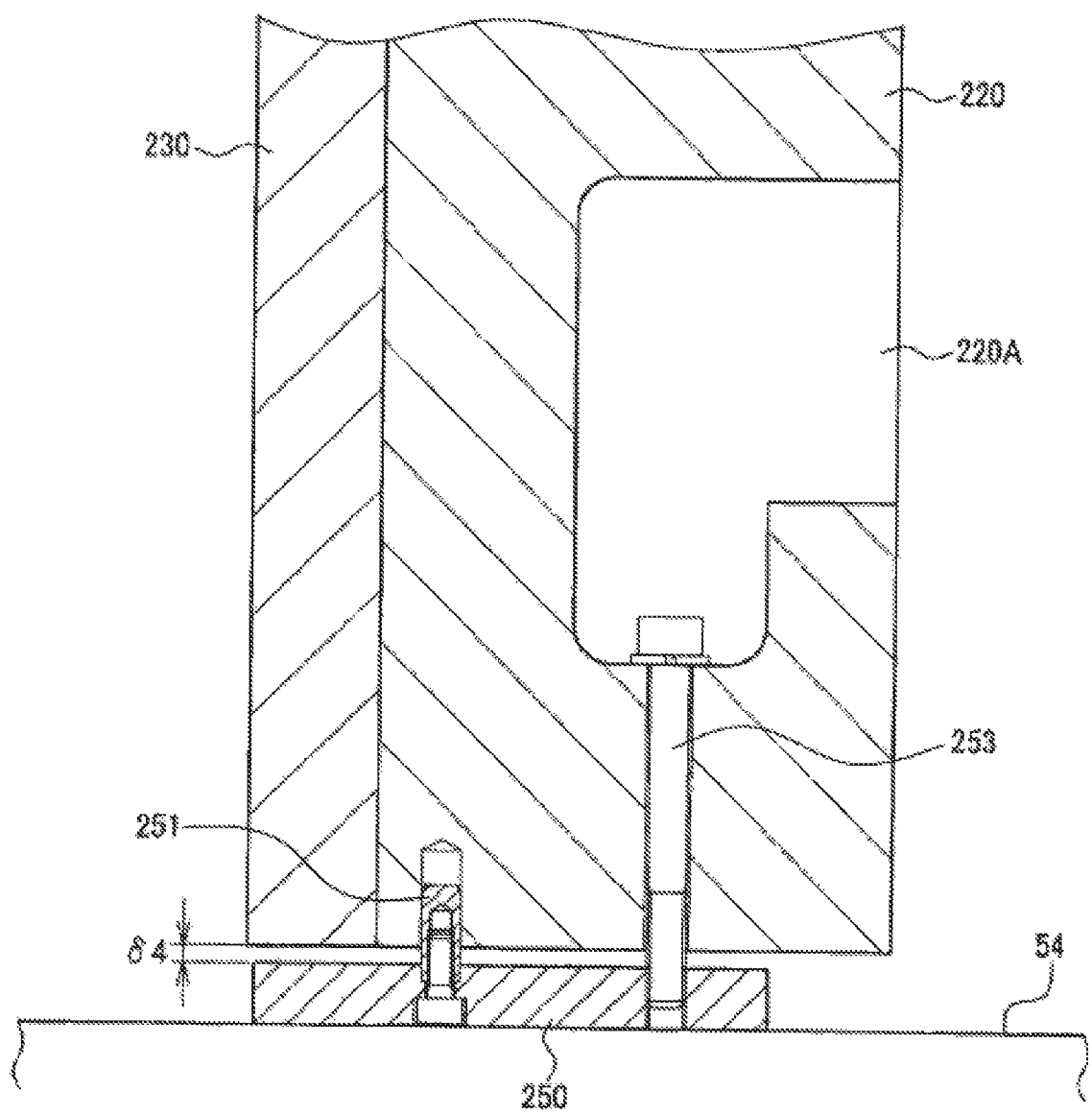
FIG. 11 is a side view showing the blow mold unit height adjusting step.
Figure 12:
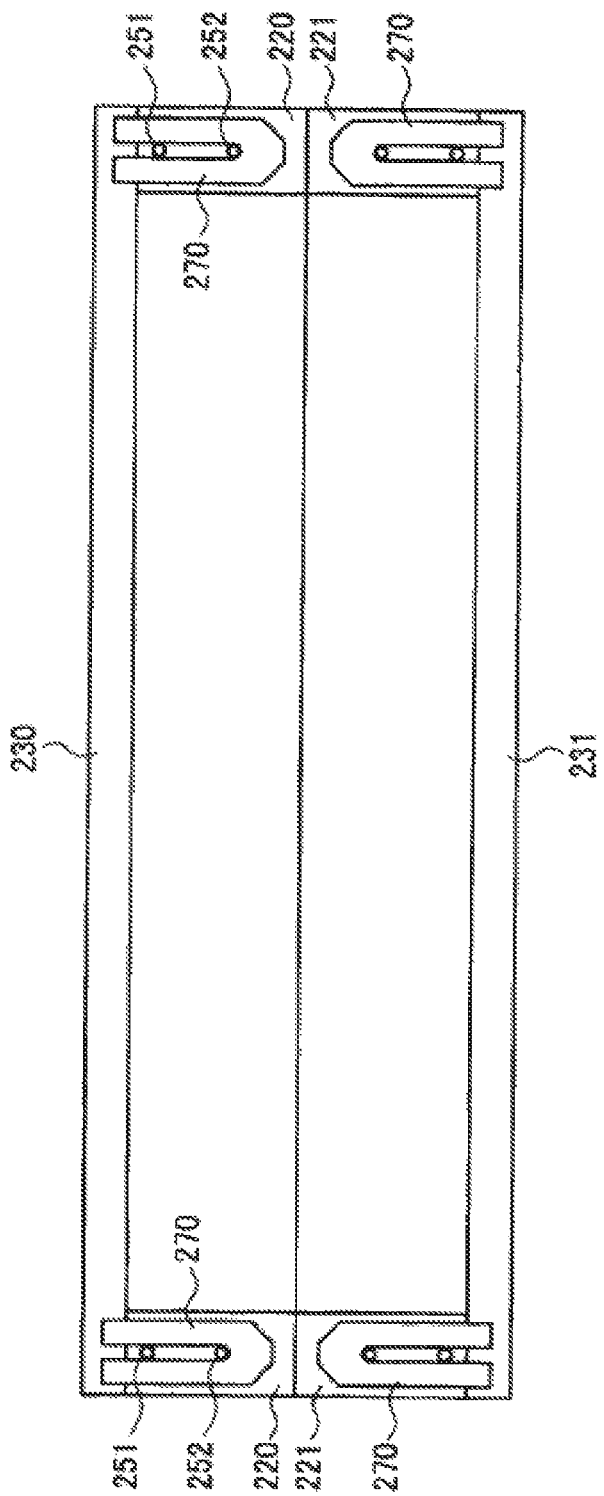
FIG. 12 is a bottom view of the blow mold unit showing a blow mold unit height adjusting step to be executed by using shim plates, from which the slide metals are omitted.

After the blow mold unit 200 is mounted as mentioned above, the height of the blow mold unit 200 can be adjusted. Firstly, the neck molds 90 (see FIG. 3) and first and second blow cavity split molds 210 and 211 are temporarily clamped to determine whether the height of the first and second cavity split molds 210 and 211 is proper or not. When not proper, as shown in FIGS. 9B and 11, a clearance δ4 is secured between the lower-most surfaces of the first and second pressure receiving plates 220, 221 and slide metals 250, shim plates 270 shown in FIG. 12 are inserted, and the height of the blow mold unit 200 is adjusted. In this case, the bolts 253 for fixing the slide metals 250 shown in FIG. 8 can be operated from above and loosened using the holes (hollow portions) 220A and 221A formed in the first and second pressure receiving plates 220 and 221. After then, as shown in FIG. 9B, by lowering the rollers 260, there can be secured the clearances δ4 between the lower-most surfaces of the first and second pressure receiving plates 220 and 221 and slide metals 250. In this manner, the rollers 260 can be used not only when they are rolled on the lower base 54 in contact therewith to carry in the blow mold unit 200 but also when the height of the blow mold unit 200 is adjusted.

After then, as shown in FIG. 12, the shim plates 270 can be inserted between the lower-most surfaces of the first and second pressure receiving plates 220 and 221 and slide metals 250. The shim plate 270 has a U-like shape which can be positioned by a positioning pin 251 and a bolt 253. After insertion of the shim plates 270, when the rollers 260 are lowered and the bolts 253 are fastened to fasten the slide metals 250 to the lower-most surfaces of the first and second pressure receiving plates 220 and 221, the height adjustment is ended.

Although description has been given specifically of the embodiment, it is easy for a person skilled in the art to understand that various modifications are possible without departing substantially from the new matters and effects of the invention. Therefore, such modifications are to fall under the scope of the invention. For example, any terms used at least once together with different terms of broader or synonymous sense in the specification or drawings can be replaced with such different terms in any portions of the specification and drawings.

For example, the invention is not limited to a blow molding machine of a rotation transfer type but can also be similarly applied to a blow molding machine of a horizontal transfer type.

The present application is based on Japanese Patent Application No. 2011-232359 filed on Oct. 24, 2011 and the contents thereof are incorporated herein for reference.

DESCRIPTION OF REFERENCE NUMERALS AND SIGNS

50: blow molding machine
54: base (lower base)
81A, 81B: first and second mold clamping plates
82: mold clamping/mold opening device (blow mold clamping mechanism)
84: blow mold
150: elevation rod
151: engaging portion
200: blow mold unit
210, 211: first and second blow cavity split molds
212: raised bottom mold
220: first pressure receiving plate
220A: hollow portion
221: second pressure receiving plate
221A: hollow portion
230: first fixing plate
231: second fixing plate
232: third fixing plate
232A: first surface
232B: second surface
234: pressure receiving rod
234A: engaged portion
234B: flange
235: coupling member
240: placement portion
240A: third pressure receiving plate
240B: fourth pressure receiving plate
250: slide metal
251: pin
252: screw hole
253: bolt
260: roller
262, 263: roller drive member
270: shim plate

The invention claimed is:

1. A blow mold unit to be connected to first and second mold clamping plates movable such that they are symmetrical to each other by a mold clamping/mold opening device of a blow molding machine and an elevation device of the blow molding machine, the blow mold unit comprising:

a blow mold including first and second blow cavity split molds to be clamped by bringing mold parting surfaces thereof into contact with each other, and a plurality of raised bottom molds that define a plurality of raised bottom shapes for a plurality of cavities defined by the first and second blow cavity split molds;

first and second pressure receiving members that have parting surfaces and that receive mold clamping pressure by bringing the parting surfaces into contact with each other;

a first fixing plate to which the first blow cavity split mold and the first pressure receiving member are fixed and to be connected to the first mold clamping plate;

a second fixing plate to which the second blow cavity split mold and the second pressure receiving member are fixed and to be connected to the second mold clamping plate;

a third fixing plate interposed between the first and second fixing plates and to which the plurality of raised molds are fixed at a first surface thereof;

a pressure receiving rod extending down from a second surface of the third fixing plate opposed to the first surface; and a placement portion fixed to at least one of the first and second fixing plates and placing the third fixing plate thereon when the first and second blow cavity split molds are closed, wherein a low part of the first pressure receiving member includes a first hollow portion, and a low part of the second pressure receiving member includes a second hollow portion, wherein a first engaging portion of the pressure receiving rod is engageable in a vertical direction with a second engaging portion of an elevation rod of the elevation device, wherein the first and second pressure receiving members each include:
  a roller rollingly contacting with a base of the blow molding machine; and
  a roller drive member that drives the roller lower from an elevated position where the roller does not project from a lower-most surface of the blow mold unit to a lowered position where the roller rollingly contacts with the base, wherein the first pressure receiving member is fixed to the first fixing plate at both sides of the first blow cavity split mold, wherein the second pressure receiving member is fixed to the second fixing plate at both sides of the second blow cavity split mold, wherein a first slide metal is fixed to a lower-most surface of the first pressure receiving member and a second slide metal is fixed to a lower-most surface of the second pressure receiving member, wherein the first slide metal includes a first pin insertable into a first hole formed in the lower-most surface of the first pressure receiving member and a first screw hole to which a first bolt is threadedly engaged in the first pressure receiving member, and the second slide metal includes a second pin insertable into a second hole formed in the lower-most surface of the second pressure receiving member and a second screw hole to which a second bolt is threadedly engaged in the second pressure receiving member, and wherein a first bolt hole is formed to penetrate from an upper surface facing the first hollow portion to the lower-most surface of the first pressure receiving member and the first bolt is inserted into the first bolt hole from the upper side and is threadedly engaged to the first screw hole, and a second bolt hole is formed to penetrate from an upper surface facing the second hollow portion to the lower-most surface of the second pressure receiving member and the second bolt is inserted into the second bolt hole from the upper side and is threadedly engaged to the second screw hole.

2. The blow mold unit according to claim 1, wherein a tapered surface is formed on at least one of the first engaging portion of the pressure receiving rod and the second engaging portion of the elevation rod, and the second engaging portion centers and guides the first engaging portion.

3. The blow mold unit according to claim 1, wherein the placement portion includes third and fourth pressure receiving members that receive the mold clamping pressure by bringing the parting surfaces thereof into contact with each other, the third pressure receiving member being fixed to the first fixing plate, and the fourth pressure receiving member being fixed to the second fixing plate.

4. A blow molding machine, comprising:
a base;
the blow mold unit according to claim 1, which is supported on the base,
a mold clamping/mold opening device provided on the base and which drives the first and second fixing plates of the blow mold unit to clamp/open the first and second blow cavity split molds; and
an elevation device that drives the elevation rod to lift and lower the plurality of raised bottom molds of the blow mold unit.

5. A blow molding machine comprising:
a base;
a blow mold unit which is supported on the base, the blow mold unit including:
  a blow mold including first and second blow cavity split molds to be clamped by bringing mold parting surfaces thereof into contact with each other, and a plurality of raised bottom molds that define a plurality of cavities defined by the first and second blow cavity split molds;
  first and second pressure receiving members that have parting surfaces and that receive mold clamping pressure by bringing the parting surfaces into contact with each other;
  a first fixing plate to which the first blow cavity split mold and the first pressure receiving member are fixed and to be connected to the first mold clamping plate;
  a second fixing plate to which the second blow cavity split mold and the second pressure receiving member are fixed and to be connected to the second mold clamping plate;
  a third fixing plate interposed between the first and second fixing plates and to which the plurality of raised molds are fixed at a first surface thereof;
  a pressure receiving rod extending down from a second surface of the third fixing plate opposed to the first surface; and
  a placement portion fixed to at least one of the first and second fixing plates and placing the third fixing plate thereon when the first and second blow cavity split molds are closed, wherein a low part of the first pressure receiving member includes a first hollow portion, and a low part of the second pressure receiving member includes a second hollow portion, and wherein a first engaging portion of the pressure receiving rod is engageable in a vertical direction with a second engaging portion of an elevation rod of the elevation device;

a mold clamping/mold opening device provided on the base and drives the first and second fixing plates of the blow mold unit to clamp/open the first and second blow cavity split molds; and an elevation device that drives an elevation rod to lift and lower the plurality of raised bottom molds of the blow mold unit, wherein the first and second pressure receiving members each include:
- a roller rollingly contacting with the base of the blow molding machine; and
- a roller drive member that drives the roller lower from an elevated position where the roller does not project from a lower-most surface of the blow mold unit to a lowered position where the roller rollingly contacts with the base, wherein the first pressure receiving member is fixed to the first fixing plate at both sides of the first blow cavity split mold, wherein the second pressure receiving member is fixed to the second fixing plate at both sides of the second blow cavity split mold, wherein a first slide metal is fixed to a lower-most surface of the first pressure receiving member and a second slide metal is fixed to a lower-most surface of the second pressure receiving member, wherein the first slide metal includes a first pin insertable into a first hole formed in the lower-most surface of the first pressure receiving member and a first screw hole to which a first bolt is threadedly engaged in the first pressure receiving member, and the second slide metal includes a second pin insertable into a second hole formed in the lower-most surface of the second pressure receiving member and a second screw hole to which a second bolt is threadedly engaged in the second pressure receiving member, and wherein a first bolt hole is formed to penetrate from an upper surface facing the first hollow portion to the lower-most surface of the first pressure receiving member and the first bolt is inserted into the first bolt hole from the upper side and is threadedly engaged to the first screw hole, and a second bolt hole is formed to penetrate from an upper surface facing the second hollow portion to the lower-most surface of the second pressure receiving member and the second bolt is inserted into the second bolt hole from the upper side and is threadedly engaged to the second screw hole.

* * * * *